UNITED STATES PATENT OFFICE.

HENRY A. GARDNER, OF WASHINGTON, DISTRICT OF COLUMBIA.

COLORED-CEMENT PRODUCT AND PROCESS OF PRODUCING THE SAME.

1,100,129.  Specification of Letters Patent.  Patented June 16, 1914.

No Drawing.   Application filed February 18, 1913.   Serial No. 749,248.

*To all whom it may concern:*

Be it known that I, HENRY A. GARDNER, a citizen of the United States, residing at Washington, in the District of Columbia, have invented certain new and useful Improvements in Colored-Cement Products and Processes of Producing the Same, of which the following is a specification.

My invention relates to a method of producing colored cement or concrete articles or products.

Portland cement and similar cementitious materials are, for the most part, of a grayish tint and concrete made up of such materials has the same color. To produce colored articles of these materials, it has been proposed to add coloring matter, but such additions are limited to the use of a small number of pigments such as iron oxid or ocher with which only a few limited weak colored effects can be produced; the use of most chemical colors for this purpose being impracticable on account of their sensitiveness to the caustic action of the basic lime compounds which are liberated when the cement sets.

I have discovered a method of treating Portland cement and the like by which permanent and brilliant color effects can be obtained.

My process consists in adding to the cement or mortar, at the time of mixing, a non-hydrous paste, made up of a mineral or chemical color, ground in an organic protective substance of an unsaponifiable nature, such as hydrocarbon or petroleum oils. Coloring materials suitable for my purpose are metallic oxids, metallic chromates, and silicious earths, such as ocher, umber and sienna, while color lakes precipitated upon a color base, such as barytes, aluminum hydrate, etc., represent the class of suitable organic colors which are well adapted for use in this method. Of the latter class of colors, the paranitranilin and toluidin reds are of special value.

In the preparation of the color addition, I grind the pigment in the protective substance to a smooth paste of suitable consistency.

As an example of my process, the following is given:—I grind together in a mortar, mill, or other apparatus, equal parts of neutral petroleum oil and chromium oxid green until a smooth paste of suitable consistency is produced. Twenty parts of the resulting paste is added to one hundred parts of Portland cement, previously mixed with two hundred parts of sharp sand. Sufficient water is added and the materials worked together until an evenly colored mass is produced, which is then ready for placement. It may be molded into various forms for producing art objects or may be used as a stucco for walls and ceilings or for laying cement floors or any other analogous purpose. The thus colored constructions, upon hardening, have a permanent color and possess a high degree of impermeability and resistance to surface disintegration. The non-saponifiable nature of the protective substance which is ground with the color before the latter is brought into presence of water inhibits any action on the pigments by the caustic lime compounds developed by setting cement, even when such pigments are of chemical origin. For instance, the red oxids of iron may be used without danger of material darkening in shade or of diminution of their brilliance.

I claim:—

1. The method of coloring cementitious materials such as Portland cement or the like which consists in mixing therewith a non-hydrous paste containing a pigment and an unsaponifiable protective vehicle.

2. The method of coloring cementitious materials such as Portland cement and the like which consists in mixing therewith a non-hydrous paste containing a pigment and an unsaponifiable oil.

3. The method of coloring cementitious materials such as Portland cement and the like which consists in mixing therewith a non-hydrous paste containing a pigment and an unsaponifiable hydrocarbon oil.

4. A colored cement article comprising a body of cementitious material such as Portland cement and the like having mixed therewith a pigment and an unsaponifiable material serving to protect said pigment.

5. A colored cement article comprising a body of cementitious material such as Portland cement and the like having mixed therewith a pigment and an unsaponifiable oil serving to protect said pigment.

6. A colored cement article comprising a body of cementitious material such as Portland cement and the like having mixed therewith a pigment and an unsaponifiable hydrocarbon oil serving to protect said pigment.

In testimony whereof I affix my signature in presence of two witnesses.

HENRY A. GARDNER.

Witnesses:
C. W. FOWLER,
J. H. BRICKENSTEIN.